United States Patent [19]

Saka et al.

[11] Patent Number: 4,952,199
[45] Date of Patent: Aug. 28, 1990

[54] TOOTHED SINTERED PULLEY

[75] Inventors: Tsutomu Saka; Katsuaki Sato, both of Saitama, Japan

[73] Assignee: Honda Giken Kogyo Kabushiki Kaisha, Tokyo, Japan

[21] Appl. No.: 386,077

[22] Filed: Jul. 28, 1989

[30] Foreign Application Priority Data

Jul. 29, 1988 [JP] Japan .................. 63-100903[U]
Jul. 29, 1988 [JP] Japan .................. 63-100904[U]

[51] Int. Cl.$^5$ .................. F16H 7/02; F16H 55/17
[52] U.S. Cl. .................................................. 474/152
[58] Field of Search ............... 474/152, 153, 166, 167; 29/159 R

[56] References Cited

FOREIGN PATENT DOCUMENTS 0118370 7/1983 Japan ................................ 474/152
0128562 8/1983 Japan ................................ 474/152

*Primary Examiner*—Thuy M. Bui
*Attorney, Agent, or Firm*—Armstrong, Nikaido, Marmelstein, Kubovcik & Murray

[57] ABSTRACT

In a toothed sintered pulley comprising a rim having a large number of teeth on its outer peripheral surface and lightening grooves at those portions of its inner peripheral surface which correspond to the individual teeth, a boss located radially inside of the rim, and a connection which connects the inner peripheral surface of the rim with an outer peripheral surface of the boss, the porosity of the rim is set larger than that of the boss. In addition, the connection is connected to axially intermediate portions of the inner peripheral surface of the rim, and lands are provided in a one-side half of the rim projecting from this connection in one of axial directions, so that each land is located between the two adjacent lightening grooves, with the radial thickness of the land being gradually increased from an outer end face of the one-side half toward the connection. This makes it possible to provide a toothed sintered pulley which is lightweight; in which any backlash noise due to meshing of the rim with a belt can be reduced, and the strength of the boss cannot be injured, and in which the rigidity of the one-side half in the rim is improved while suppressing the increase in weight thereof to the utmost.

7 Claims, 5 Drawing Sheets

TOOTHED SINTERED PULLEY

BACKGROUND OF THE INVENTION

1. Field of the Invention

The present invention relates to a toothed sintered pulley for use in power transmitting systems in various apparatuses, and more particularly, to an improvement in toothed sintered pulley comprising a rim having a large number of teeth on its outer peripheral surface and lightening grooves at those portions of its inner peripheral surface which correspond to the individual teeth, a boss located radially inside of the rim, and a connection which connects the inner peripheral surface of the rim with an outer peripheral surface of the boss.

2. Description of the Prior Art

There is a conventionally known toothed pulley in the form of a pressed pulley made from a sheet metal.

For example, for a toothed pulley for driving a cam shaft of an engine, reductions in size and weight are required in correspondence to increases in rotation and output power of the engine. However, the prior art pressed pulley is capable of meeting the need for the reduction in weight, but spontaneously has a limit in production with regard to the reduction in size.

Thereupon, a toothed sintered pulley produced by use of a powdered metal technique has been developed to meet the demand for reduction in size. In this type of the pulley, a large number of lightening grooves are provided in the rim as described above in order to provide a reduction in weight, but under the present circumstances, it is desired to provide a further reduction in weight to reduce an inertia moment and to reduce a backlash noise generated by meshing of the pulley with a belt.

FIG. 6 illustrates a general arrangement of a cam shaft driving system in an engine 01, in which a toothed sintered pulley 03 is attached through a boss 011 to a cam shaft 02 cantilever-supported to the engine 01, and a timing belt 07 is wound around the toothed pulley 03 and a toothed pulley 06 mounted on a crank shaft 05.

In the above construction, if the cam shaft 02 flexes even somewhat due to a tensile force of the timing belt 07 during operation of the engine, the timing belt 07 is displaced toward an outer half 010$a$, of a rim 010 in the toothed sintered pulley 03, projecting from a connection 012 in one of axial directions away from the engine 01, and as a result, an excessive stress is produced in the outer half 010$a$ due to the tensile force of the timing belt 07.

In this case, the rigidity of the outer half 010$a$ is relatively low due to the large number of lightening grooves and hence, in order to sufficiently resist such stress, it is necessary to provide an increase in rigidity of the outer half 010$a$.

SUMMARY OF THE INVENTION

The present invention has been accomplished with the above circumstances in view, and it is an object of the present invention to provide a toothed sintered pulley which is capable of meeting the above-described demands.

To attain the above object, according to a first aspect of the present invention, there is proposed a toothed sintered pulley comprising a rim having a large number of teeth on its outer peripheral surface and lightening grooves at those portions of its inner peripheral surface which correspond to the individual teeth, a boss located radially inside of the rim, and a connection which connects the inner peripheral surface of the rim with an outer peripheral surface of the boss, wherein the porosity of the rim is set larger than that of the boss.

In addition, according to a second aspect of the present invention, there is proposed a toothed sintered pulley comprising a rim having a large number of teeth on its outer peripheral surface and lightening grooves at those portions of its inner peripheral surface which correspond to the individual teeth, a boss located radially inside of the rim, and a connection which connects axially intermediate portions of the inner peripheral surface of the rim with an outer peripheral surface of the boss, wherein lands are provided in a one-side half of the rim projecting from the connection in one of axial directions, so that each land is located between the two adjacent lightening grooves, with the thickness of the land being gradually increased from an outer end face of the oneside half toward the connection.

According to the feature of the first aspect, the inertia moment of the toothed sintered pulley is reduced with an increase in weight of the rim.

In addition, any backlash noise generated by meshing of the teeth of the rim with the belt is absorbed by an infinite number of pores present in the rim.

Further, because the porosity of the boss is maintained relatively low, the boss has a larger strength with an increase in density, and this ensures that even if a clamping force is applied to the boss in mounting the toothed sintered pulley on a rotary shaft, the boss cannot be buckled.

According to the feature of the second aspect, the rigidity of the one-side half of the rim is improved with the special increasing of the thickness of each land. In this case, because the thickness adjustment is provided such that the thickness is largest in a base end portion of each land particularly required for the rigidity, the increase in weight of the rim can be suppressed to the utmost.

In addition, the gradual increasing of the thickness of each land ensures that each land has no place producing a notch effect, which is effective in improving the durability.

Moreover, if an axial pressing force is applied from the side of the one-side half in providing a powder compact which is a material for the toothed sintered pulley, the one-side half tends to have a lower density as compared with the other side half. However, if the thickness of each land is gradually increased in the above manner, an angular component of a force with respect to the axial direction acts on the one-side half and therefore, a reduction in density thereof can be inhibited.

Further, in addition to the second aspect, if the axial length of the one-side half is shorter than that of the other side half, a such shortening of the axial length of the one side half cooperates with the increase in thickness of each land, to further improve the rigidity of the one-side half.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 2 to 4 illustrate one embodiment of a toothed sintered pulley according to the present invention, wherein FIG. 2 is a front view of the toothed sintered pulley;

FIG. 3 is a sectional view taken along a line 111—111 in FIG. 2; and

FIG. 4 is an enlarged view of a portion indicated by an arrow IV;

DESCRIPTION OF THE PREFERRED EMBODIMENTS

The present invention will now be described by way of one embodiment with reference to the accompanying drawings.

Figure 1:
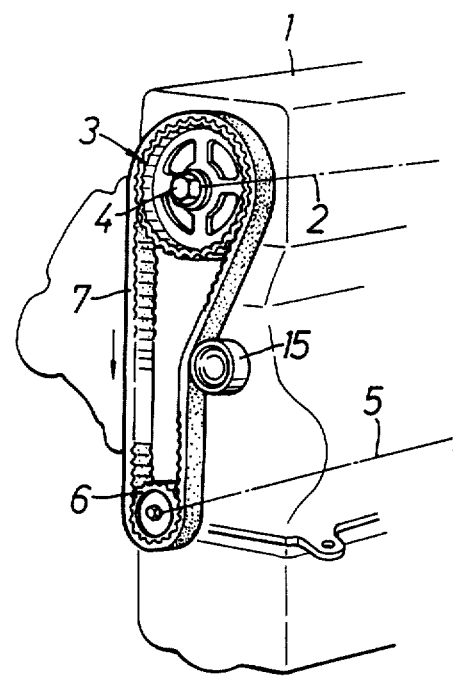
FIG. 1 is a perspective view of a cam shaft driving system in an engine.

FIG. 1 illustrates a cam shaft driving system in an engine 1 as an apparatus. A toothed sintered pulley 3 is attached to a cam shaft 2 as a rotary shaft cantilever-supported to the engine 1 by a bolt 4, and a timing belt 7 is wound around the toothed sintered pulley 3 and a toothed pulley 6 mounted on a crank shaft 5. The reference numeral 15 is a tension pulley urged toward a loose side of the timing belt 7.

Figure 2:
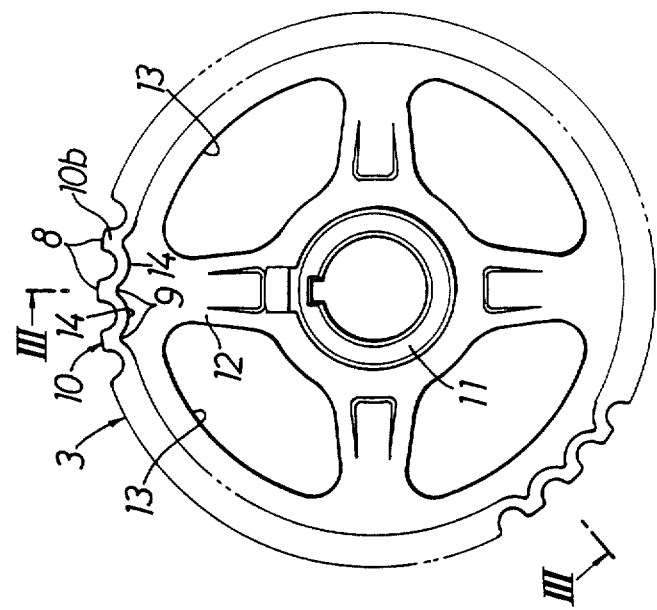
Figure 3:
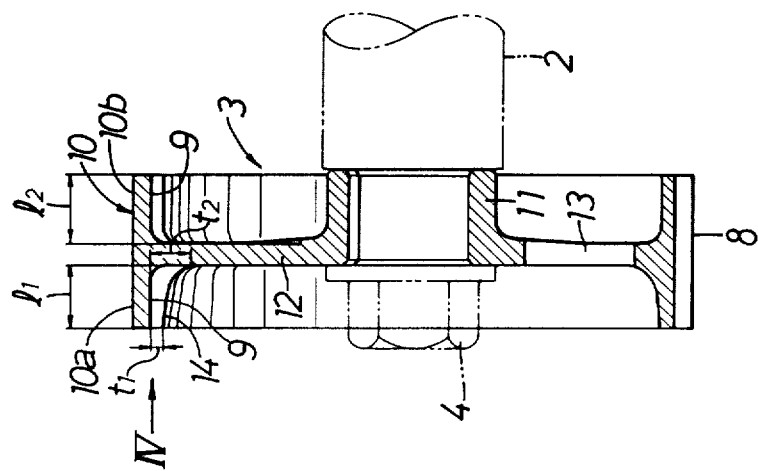
Figure 4:
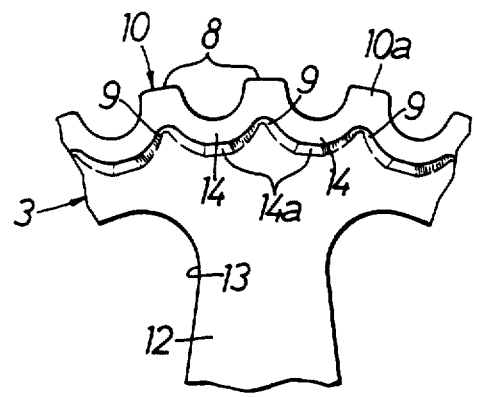

As shown in FIGS. 2 to 4, the toothed sintered pulley 3 comprises a rim 10 having a large number of teeth 8 on its outer peripheral surface and lightening grooves 9 in those portions of its inner peripheral surface which correspond to the teeth 8, a boss II located radially inside of the rim 10, and a connection 12 comprised of a plurality of (four, in the illustrated embodiment) rods, which connects axially intermediate portions of the inner peripheral surface of the rim 10 With an outer peripheral surface of the boss 11. In an assembled state, the boss 11 is fitted in the cam shaft 2, and the connection 12 has a plurality of openings 13.

In an outer half 10a of the rim 10 which projects from the connection 12 in one of axial directions away from the engine 1, the radial thickness of each land 14 located between the two adjacent recessed grooves 9 is gradually increased from an outer end face of the outer half 10a toward the connection 12. Specifically, in each land 14, if the thickness at the outer end face side of the outer half 10a is represented by $t_1$, and the thickness at the side of the connection 12 is represented by $t_2$, the relationship $t_2 > t_1$ is established.

With the above construction, the rigidity of the outer half 10a of the rim 10 is improved with the increase in thickness of each land 14.

This ensures that even if the cam shaft flexs even somewhat due to a tensile force of the timing belt 7 during operation of the engine 1, causing the timing belt 7 to be displaced toward the outer half 10a of the rim 10, resulting in an excessive stress generated on the outer half 10a due to the tensile force of the timing belt 7, the outer half 10a sufficiently resists such stress and therefore, the toothed sintered pulley 3 exhibits an excellent durability.

In this case, the adjustment of thickness in each land 14 is provided so that the thickness is largest in that base end portion of the each land 14 closer to the connection 12 which is required particularly for the rigidity and hence, an increase in weight of the outer half 10a and thus the rim 10 is suppressed to the utmost.

The gradual increasing of the thickness of each land 14 ensures that each land 14 has no place producing a notch effect, which is effective in improving the durability.

Further, in the rim 10, if the axial length of the outer half 10a is represented by $l_1$ and the axial length of an inner half 10b closer to the engine 1 is by $l_2$, the relationship $l_2 > l_1$ is established.

If a decrease In axial length $l_1$ of the outer half 10a is provided in this manner in addition to the increasing of thickness of each land 14, the rigidity of the outer half 10a is further improved.

Yet further, in the toothed sintered pulley 3, the porosity of the rim 10 is set larger than that of the boss 11.

With such construction, the inertia moment of the toothed sIntered pulley 3 may be reduced with a reduction in weight of the rim 10.

In addition, any backlash noise generated by meshing of the teeth 8 of the rim 10 with the timing belt 7 may be absorbed by an infinite number of pores present in the rim 10.

Furthermore, because the porosity of the boss 11 is maintained relatively low, the boss 11 has a larger strength with an increase in density. This ensures that even if a larger clamping force is applied to the boss 11 in attaching the toothed sintered pulley 3 to the cam shaft 2 by means of the bolt 4, the boss 11 cannot be buckled.

Figure 5:
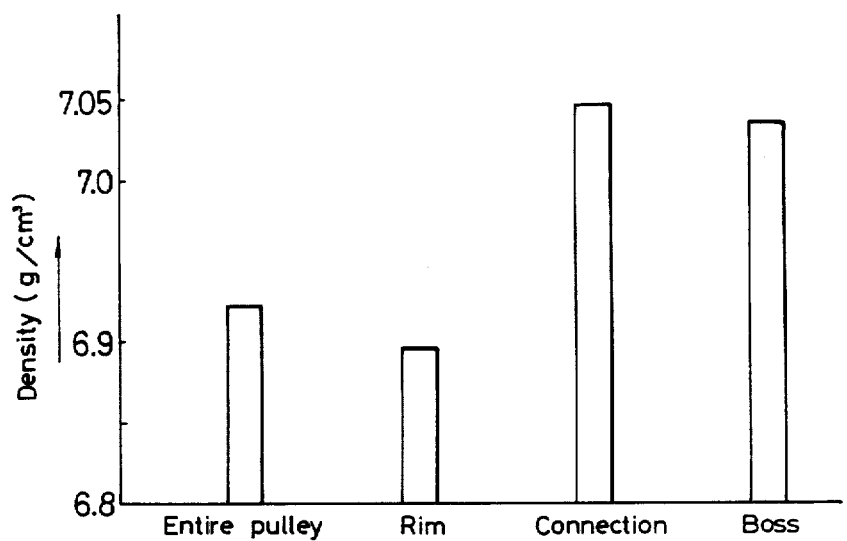
FIG. 5 is a graph illustrating variations in density of the entire soothed sintered pulley and its individual parts.
Figure 6:
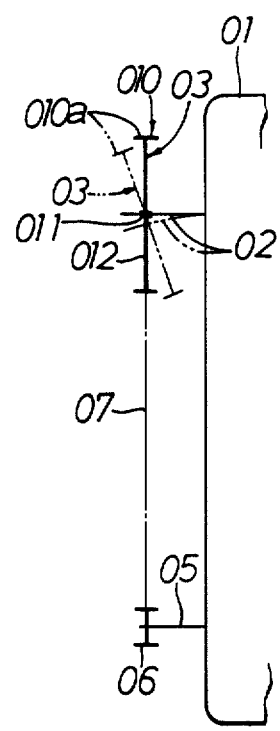
FIG. 6 is a diagram illustrating the behavior of the toothed sintered pulley during operation of the engine.

FIG. 5 illustrates one example of the density of the entire toothed sintered pulley 3 and its individual parts.

The toothed sintered pulley 3 is produced through the following individual steps: a step of placing an atomized powder comprising 1.0% by weight of C. 1.5% by weight of Cu and the balance of Fe into a powder compact forming mold, wherein the proportion of powder filled in a rim forming region in the mold is adjusted to be less than those in boss- and connection-forming regions in the mold, a step of pressing the powder with a pressure of 5.5 t/cm$^2$ to provide a powder compact, and a step of sintering the power compact at 1130° C. in an inert gas atmosphere.

As can be seen from FIG. 5, the density of the rim 10 is of about 6.89 g/cm$^3$, and the density of the boss 11 is of about 7.04 g/cm$^3$.

It should be noted that ways for providing different densities and thus different porosities between the rim 10 and the rim 11 which may be used include those for varying the pressing force, for varying the diameter of the powder, and so on, in addition to the adjustment of the proportion of powder filled.

In the outer half 10a, a top face 14a of each land 14 is formed flatly, as clearly shown in FIG. 4. This results from the compression by a tool in a sizing step. If each land 14 is subjected to such a compression force, an increase in density is achieved, and the rigidity of each land 14 and thus the outer half 10a is further improved.

In addition, in the powder pressing step, the powder compact which is a material for the toothed sintered pulley 3 is obtained by applying an axial pressing force from the side of the outer half 10a. Therefore, the outer half 10a tends to have a lower density as compared with the inner half 10b, but if the thickness of each land 14 is set in the above manner, an angular component of a force with respect to an axial direction acts on the outer half 10a and hence, a decrease in density thereof is inhibited.

What is claimed is:

1. A toothed pulley of sintered material comprising a rim having outer and inner peripheral surfaces, a large number of teeth on said outer peripheral surface and lightening grooves at those portions of said inner peripheral surface which corresponds to individual of said teeth, a boss located radially inside of said rim, and a connection which connects said inner peripheral surface of said rim with an outer peripheral surface of said boss, wherein the porosity of said sintered material in said rim is larger than the porosity of said sintered material in said boss.

2. A toothed pulley according to claim 1, wherein the density of said rim is set lower than the density of said boss.

3. A toothed pulley according to claim 1, wherein the density of said boss is set lower than the density of said connection.

4. A toothed sintered pulley comprising a rim having a large number of teeth on its outer peripheral surface and lightening grooves at those portions of its inner peripheral surface which correspond to the individual teeth, a boss located radially inside of said rim, and a connection which connects axially intermediate portions of the inner peripheral surface of said rim with an outer peripheral surface of said boss, wherein lands are provided in a one-side half of said rim projecting from said connection in one of axial directions so that each land is located between the two adjacent tightening grooves, with the thickness of the land being gradually increased from an outer end face of said one-side half toward said connection.

5. A toothed sintered pulley according to claim 4, wherein said rim is formed so that the axial length of said one-side half thereof is shorter than that of the other side half projecting from said connection in the other of the axial directions.

6. A toothed sintered pulley according to claim 4, wherein a top face of each land in the one-side half of said rim is formed flatly.

7. A toothed sintered pulley according to claim 4, 5 or 6, wherein said boss is fitted in a rotary shaft cantilever-supported to an apparatus, with the one-side half of said rim projecting in a direction away from the apparatus.

* * * * *